United States Patent
Szabo et al.

(10) Patent No.: US 12,038,056 B2
(45) Date of Patent: Jul. 16, 2024

(54) METHOD FOR ADJUSTING THE SLACK OF A BRAKE ASSEMBLY AND BRAKE ASSEMBLY

(71) Applicant: KNORR-BREMSE Systeme fuer Nutzfahrzeuge GmbH, Munich (DE)

(72) Inventors: Janos Szabo, Budapest (HU); Michael Blessing, Munich (DE); Robert Trimpe, Wessling (DE); Wolfgang Pahle, Bad Wiessee (DE); Matthias Klingner, Moorenweis (DE); Andreas Buch, Taufkirchen (DE); Andras Sipos, Munich (DE); Huba Nemeth, Budapest (HU); Csaba Kokrehel, Budapest (HU); Viktor Tihanyi, Budapest (HU); Csaba Mlinarcsek, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 560 days.

(21) Appl. No.: 17/276,893

(22) PCT Filed: Aug. 28, 2019

(86) PCT No.: PCT/EP2019/072974
§ 371 (c)(1),
(2) Date: Mar. 17, 2021

(87) PCT Pub. No.: WO2020/057920
PCT Pub. Date: Mar. 26, 2020

(65) Prior Publication Data
US 2021/0348664 A1    Nov. 11, 2021

(30) Foreign Application Priority Data
Sep. 18, 2018   (EP) .................................... 18195256

(51) Int. Cl.
*F16D 65/54* (2006.01)
*F16D 55/226* (2006.01)
(Continued)

(52) U.S. Cl.
CPC ........... *F16D 65/54* (2013.01); *F16D 55/226* (2013.01); *F16D 65/18* (2013.01); *F16D 66/027* (2013.01)

(58) Field of Classification Search
CPC ..................................................... F16D 65/54
See application file for complete search history.

(56) References Cited

U.S. PATENT DOCUMENTS 5,848,672 A * 12/1998 Brearley ............... F16D 65/183
340/453
5,957,246 A    9/1999 Suzuki
(Continued)

FOREIGN PATENT DOCUMENTS

CN    2747408 Y    12/2005
CN    101280814 A    10/2008
(Continued)

OTHER PUBLICATIONS

Chinese-language Office Action issued in Chinese Application No. 201980061039.5 dated Mar. 2, 2022 with English translation (18 pages).
(Continued)

*Primary Examiner* — Melanie Torres Williams
(74) *Attorney, Agent, or Firm* — Crowell & Moring LLP

(57) ABSTRACT

A method adjusts the slack of a brake assembly having a brake disc, a brake pad, an actuator with an output shaft driven in a forward direction to bring the brake pad and brake disc into frictional engagement defining a braking position and a reverse direction to disengage the brake pad and brake disc and to move the brake pad into a rest position,
(Continued)

and a slack adjuster for adjusting a predetermined axial slack distance between the brake pad and the brake disc. The brake pad is moved from the rest position in the reverse direction into a predetermined reference position, and an adjustment of the axial slack distance between the brake pad and brake disc is initiated.

16 Claims, 2 Drawing Sheets

(51) Int. Cl.
*F16D 65/18* (2006.01)
*F16D 66/02* (2006.01)

(56) References Cited

U.S. PATENT DOCUMENTS

| | | | |
|---|---|---|---|
| 2004/0065516 A1* | 4/2004 | Kramer | B60T 13/741 |
| | | | 188/196 R |
| 2008/0156593 A1 | 7/2008 | Severinsson et al. | |
| 2009/0145701 A1 | 6/2009 | Piccoli et al. | |
| 2009/0218179 A1 | 9/2009 | Yokoyama et al. | |
| 2013/0098719 A1 | 4/2013 | Furutani | |
| 2014/0069750 A1 | 3/2014 | Nohira et al. | |
| 2015/0240895 A1 | 8/2015 | Shin | |
| 2016/0076609 A1 | 3/2016 | Narula et al. | |
| 2017/0343069 A1 | 11/2017 | Yoshikawa et al. | |
| 2020/0270097 A1 | 8/2020 | Robibero et al. | |

FOREIGN PATENT DOCUMENTS

| | | |
|---|---|---|
| CN | 101351655 A | 1/2009 |
| CN | 202158119 U | 3/2012 |
| CN | 103057562 A | 4/2013 |
| CN | 104864006 A | 8/2015 |
| CN | 105736606 A | 7/2016 |
| CN | 107110261 A | 8/2017 |
| CN | 108430905 A | 8/2018 |
| DE | 198 50 384 A1 | 8/1999 |
| DE | 102 28 115 A1 | 1/2004 |
| JP | 2000-55093 A | 2/2000 |
| JP | 2012-240632 A | 12/2012 |

OTHER PUBLICATIONS

Japanese-language Office Action issued in Japanese Application No. 2021-538900 dated May 16, 2022 with English translation (eight (8) pages).
International Search Report (PCT/ISA/210) issued in PCT Application No. PCT/EP2019/072974 dated Nov. 15, 2019 with English translation (two (2) pages).
Written Opinion (PCT/ISA/237) issued in PCT Application No. PCT/EP2019/072974 dated Nov. 15, 2019 (seven (7) pages).
Extended European Search Report issued in European Application No. 18195256.5 dated Mar. 29, 2019 (nine (9) pages).
Chinese-language Office Action issued in Chinese Application No. 201980061039.5 dated Jul. 15, 2022 with English translation (ten (10) pages).
Japanese-language Office Action issued in Japanese Application No. 2021-538900 dated Dec. 21, 2022 with English translation (four (4) pages).

* cited by examiner

METHOD FOR ADJUSTING THE SLACK OF A BRAKE ASSEMBLY AND BRAKE ASSEMBLY

BACKGROUND AND SUMMARY OF THE INVENTION

The present invention relates to a method for adjusting the slack of a brake assembly. Further, the present invention provides a brake assembly.

Generally, an electrically actuated brake assembly comprises a brake pad and a brake disc for frictionally engaging with each other and establishing a braking force. The friction contact between brake pad and brake disc is normally established by an actuator applying an actuator force to the brake pad to move the brake pad in the direction of the brake disc. Due to friction contact between the brake pad and the brake disc, brake pad wear and brake disc wear occurs which leads to a change of the distance between the brake pads and brake disc in the idle position, respectively resting position, where no actuator force is applied and therefore no braking force is established. The increasing wearing results in that, firstly, the maximum braking force may not be reached anymore and, secondly, the desired braking force differs from the actual braking force being applied.

From US 2008/0156593 A1, a mechanical adjuster mechanism which compensates for pad wear is known. The mechanical adjusting is continuously triggered either in the engagement braking situation of the brake pad and the brake disc or alternatively in the resting position, the idle position, where no braking force is applied and into which position the brake pad moves in relation to the brake disc after each braking operation situation.

However, such a mechanical adjusting mechanism is not suitable in many brake assembly applications respectively environments.

For example, to avoid damage to the brake components, in particular when wheel brake actuators are operated with high speed and a malfunction or a power loss occurs, an energy absorption and/or storage unit may be arranged for absorbing an actuator force in case of a predetermined operation situation.

Those energy absorbing devices have as a consequence that an actuator rest position where no actuating or braking forces are applied by the wheel brake actuator, respectively the idle point, is not accurately defined, rather it depends on the braking dynamics. In particular, an output shaft of the actuator is returned after a braking actuation each time to a slightly different axial position such that the idle point, which is normally used to trigger slack adjustment, axially varies and is thus undefined.

Therefore, the known mechanical slack adjusting means are not suitable for wheel brake actuators with energy absorbing units and in other applications where the idle point cannot be defined accurately. Further, it was found out that it is not necessary to continuously perform an adjusting process at each braking actuation in order to provide reliable functioning of the brake assembly.

It is an object of the present invention to overcome the disadvantages of the state of the art, in particular to provide a more efficient method for adjusting the slack of a brake assembly particularly which is suitable for applications where the idle point cannot be accurately defined and/or where energy absorbing units are required.

The object is solved by the subject matter of the independent claims.

According to an aspect of the present invention, a method for adjusting the slack of a brake assembly is provided. The brake assembly comprises a brake disc, a brake pad, an actuator with an output shaft driven in a forward direction to bring the brake pad and brake disc into frictional engagement. The position of the brake pad and brake disc in the frictional engagement is referred to as the braking position. The output shaft may be driven in a reverse direction to disengage the brake pad and brake disc and to move the brake pad into a rest position. The rest position is referred to as the position in which no actuator force respectively no braking force is applied and which may also be referred to as an idle position to which the brake pad returns after a braking operation, in particular during dynamic or service braking operations.

The brake assembly further comprises a slack adjuster for adjusting a predetermined axial slack distance between the brake pad and the brake disc. The predetermined axial slack distance is set by the manufacturer of the vehicle or a garage employee for repairing vehicles such that an optimum braking operation characteristics may be achieved, in particular the maximum braking force can be applied and/or the delay between actuation of a brake pedal by a user respectively driver and the braking force transmission onto the brake disc by the brake pad is optimal. The slack adjuster serves to assure a reliable braking function of the brake assembly despite of an increasing wear and tear of the brake pad and/or brake disc. In other words, the slack adjuster compensates wear and tear of the brake pad and/or brake disc, in particular by decreasing and/or increasing the axial slack distance between the brake pad and the brake disc.

According to the invention, the brake pad is moved from the rest position into the reverse direction and an adjustment of the axial slack distance between the brake part and the brake disc is initiated. Due to the movement of the brake pad in the reverse direction starting from the rest position which may be referred to as a negative stroke, which is preferably performed by the actuator applying an actuation force directed in the reverse direction onto the output shaft, it is assured that a slack adjustment procedure is only performed if desired respectively necessary. Further, preferably by actively moving the brake pad in a reverse direction beyond the rest position into the predetermined reference position, a constant reference point for determining the actual axial slack distance is provided.

In an exemplary embodiment of the present invention, an axial slack value and/or a wear and tear level of the brake pad and/or brake disc are/is measured. Preferably, the axial slack value may be defined as an axial moving amplitude of the brake pad between the braking position and the rest position, in particular as an axial moving amplitude of the brake pad between the braking position and the reference position. In order to perform the measurements, suitable measuring devices maybe provided and coupled to the brake assembly, in particular to the actuator, such that a slack adjustment procedure maybe initiated. In other words, after initiation of the slack adjustment procedure, slack and/or wear and tear values are measured.

According to a further development of the present invention, the adjustment procedure is initiated if an undesired wear and tear level and/or undesired slack value is detected. Preferably, the brake pad is moved in the reverse direction from the rest position into the predetermined reference position if such an undesired wear and tear level and/or an undesired slack value is measured. Preferably, the amount of slack adjustment depends on the measured wear and tear level of the brake pad and/or brake disc.

In an example embodiment of the present invention, the measured wear and tear level of the brake pad and/or brake disc and/or the measured slack value is compared with a predetermined respective threshold value, wherein preferably a threshold value for the wear and tear level of the brake pad and/or brake disc and a threshold value for the axial slack distance is provided. The adjustment procedure, preferably moving the brake pad in the reverse direction from the rest position, may be initiated if a deviation between the measured value and the respective predetermined threshold value is detected, in particular if the measured wear and tear level of the brake pad and/or brake disc deviates from the predetermined wear and tear level threshold value and/or if the measured slack value deviates from the slack value threshold. According to a further development of the present invention, the adjustment procedure is only initiated if the deviation between the measured and the respective predetermined threshold value exceeds a predetermined deviation tolerance. For example, the deviation tolerance may be less than ±5%, ±7%, ±10%, ±15%.

According to another exemplary embodiment of the present invention, the brake pad is moved in a reverse direction against an energy absorption and/or storage unit which is arranged for absorbing and/or adapted to absorb forces acting on the output shaft in the reverse direction in case of a predetermined operation situation. Preferably, the energy absorption and/or storage unit is adapted to store energy, preferably the absorbed energy, for reuse. The energy absorption and/or storage unit may also be referred to as a protection unit, because damage to the brake assembly respectively the brake assembly components is prevented.

A predetermined operation situation may occur in an uncontrolled situation of the brake assembly, for example upon unexpected energy supply shut-off or any internal malfunction of the brake actuator. During braking the force transmitting components of the brake assembly are preloaded according to the brake force level. In a controlled situation, the actuator moves the force transmitting components back to the initial unloaded position, preferably the rest position, and smoothly brakes down the movement of the force transmitting components. If an error, such as a malfunction or a power loss, occurs during the brake down movement without using a protection unit the brake actuator components would be further accelerated by the prestressed brake assembly component, preferably a caliper unit, and stopped by a shock-like collision or impact at the movement end position, thereby resulting in damage of the brake assembly components, preferably of the actuator.

In an example embodiment of the present invention, the energy absorption and/or storage unit is adapted to dissipate the absorbed forces, preferably the absorbed energy linked with the forces acting on the output shaft in case of the predetermined operation situation. For example, the absorbed forces respectively absorbed energy, may be dissipated by means of friction, electronic resistance or viscous dampening. Due to the arrangement and functioning of the energy absorption unit, in particular, due to the dissipation of the forces acting on the output shaft in the reverse direction in case of the predetermined operation situation, excessive forces respectively excessive energy is removed from the brake assembly system in order to prevent damage.

In an example embodiment of the present invention, the energy absorption and/or storage unit is adapted to accumulate the absorbed forces. Preferably, the energy absorption and/or storage unit comprises a spring member, an accumulator or a battery. The accumulated forces, particularly the accumulated absorbed energy, maybe fed into an energy recuperation system of the vehicle, preferably an energy recuperation system of the brake assembly. In this case, the absorbed accumulated energy may subsequently be used as an energy input for the actuator in a subsequent braking operation.

In a further example embodiment of the present invention, the energy absorption and/or storage unit is adapted to counteract the forces acting on the output shaft in the reverse direction in the predetermined operation situation. In a further development, the counteracting forces act such that the kinetic energy of the output shaft caused by the forces acting on the output shaft in the reverse direction is transferred into kinetic energy of the absorption unit, heat and/or electric energy. It is therefore possible, to accumulate at least part of the absorbed output shaft forces and dissipate at least part of the absorbed output shaft forces, depending on the available energy storing space or the energy needed for a subsequent brake operation.

In an example embodiment of the present invention, the energy absorption and/or storage unit is realized in that the actuator comprises an electric machine for driving the output shaft in the reverse direction and the forward direction. The electric machine may be operable in an electric generator mode which is adapted to absorb the output shaft forces in the predetermined operation situation. The electric generator mode maybe understood as an operation mode in which mechanical energy, preferably the kinematic energy for example of the output shaft or another driving output shaft of the actuator, is converted into electrical power respectively energy. Therefore, the excessive energy being present in the predetermined operation situation may be used to feed the electric generator mode and may be used to supply further electric components of the vehicle with the energy absorbed by the energy absorption unit.

In another example embodiment of the present invention, the brake assembly comprises the braking end position in which to brake pad and the brake disc are frictionally engaged. Further, a rest end position of the brake assembly is given in which the brake pad and brake disc are disengaged. A stop element may be arranged such that it limits the axial movement of the output shaft in the reverse direction beyond the rest position. This means that the stop element is positioned offset with respect to the rest position in the reverse direction. Further, the energy absorption and/or storage unit may be arranged such that an impact of the output shaft on the stop element is prevented, thereby preventing damage to the brake assembly.

In a further development of the present invention, the energy absorption and/or storage unit comprises a spring member or a viscous damper associated with the stop element such that upon movement of the output shaft from the rest position in the reverse direction a preferably oppositely oriented spring force and/or dampening force is applied on to the output shaft. The generated spring force and/or dampening force counteracts the critical forces acting on the output shaft in the reverse direction of the predetermined operation situation. Thus, the axial movement of the output shaft in the reverse direction is slowed down, preferably stopped.

According to an example embodiment of the present invention, the energy absorption and/or storage unit is an electric energy absorption and/or storage unit. Preferably, the energy absorption and/or storage unit is electrically activated, respectively deactivated, and or coupled to the actuator such that in case of the predetermined operation situation the energy absorption and/or storage unit is automatically activated in order to absorb the output shaft forces.

According to a further development of the present invention, in case of the predetermined operation situation, the actuator engages a corresponding protection circuit, namely in terms of an electronic resistor for dissipating at least part of the absorbed energy and/or in terms of an electronic accumulator for storing at least part of the absorbed energy, even if the actuator is not supplied with energy.

In another example embodiment of the present invention, the energy absorption and/or storage unit comprises an eddy current brake, also known as an induction brake, electric brake or electric retarder, that slows down or stops the axial movement of the output shaft for example by dissipating the kinetic energy of the output shaft as heat. Upon movement of the output shaft in the reverse direction in the predetermined operation situation, preferably beyond the rest position, an electric current preferably through a coil of the energy absorption unit, preferably the eddy current brake, is induced, wherein particularly the induced electric current may be accumulated or dissipated by the energy absorption unit. According to the function principle of the eddy current brake electric current is induced because of an outer magnetic field acting on a moving component of the actuator or for example the output shaft, and the induced electric current induces a magnetic field which is oppositely oriented with regard to the outer magnetic field. Due to the fact of the oppositely oriented magnetic field with regard to the original magnetic field, the movement of the output shaft is slowed down, preferably stopped, whereby damage to the brake components resulting from high inertia and high dynamics of the brake actuator is prevented. It is possible that the electric resistor may be internally realized by the actuator itself, or externally realized by a separate electronic resistor component.

In an example embodiment of the invention, the actuator is coupled to the energy absorption and/or storage unit and configured in that the absorbed forces by the energy absorption and/or storage unit are dissipated by the actuator, wherein particularly the actuator comprises an electric resistor. For example, according to this embodiment, a brake resistor is provided which may be connected by default with a normally closed electric circuit and actively disconnected via a switch in normal operation mode, preferably if no predetermined operation situation occurs. Alternatively and or additionally, a capacitor may be connected to the circuit in order to store the absorbed energy preferably for reuse.

According to another example embodiment of the present invention, the actuator may be a pneumatic, electro-mechanic or hydraulic actuator. It is clear that the inventive concept according to the invention is therefore not limited to a specific type of actuator used in the corresponding brake assembly.

According to another aspect of the present invention, a brake assembly comprises a brake disc in rotational engagement with a wheel of a vehicle. Therefore, the brake disc performs a rotational movement in accordance with the rotation of the wheel of the vehicle during driving the car. Further, a brake pad frictionally engages the brake disc when an actuator force is applied thereto, preferably in order to perform a dynamic braking operation or a service braking operation. The brake assembly also comprises an actuator having an output shaft driven in a forward direction to bring the brake pad and the brake disc into frictional engagement which defines the braking position of the brake assembly. The actuator may for example comprise an electromotor and a transmission member which are coupled to the output shaft such that a rotational movement of the electromotor, preferably of a rotor of the electromotor, is converted into an axial translational movement of the output shaft by means of the transmission member. The output shaft may also be driven in a reverse direction, opposite to the forward direction, to disengage the brake pad and brake disc and to move the brake pad into a rest position. The rest position may be defined as the position in which no actuator force respectively braking force is applied and/or as the position to which the brake pad moves after a braking operation, preferably a dynamic braking operation. The moving direction of the brake pad is not necessarily coaxially arranged with regard to a moving direction of the output shaft, however, a forward movement of the output shaft leads to a forward movement of the brake pad preferably into the frictional engagement with the brake disc, and a reverse movement of the output shaft leads to a reverse movement of the brake disc preferably to disengage the frictional contact with the brake disc.

According to the invention, the brake assembly comprises a slack adjuster which is adapted to adjust or which adjusts a predetermined axial slack distance between the brake pad and the brake disc in the rest position of the brake pad. The slack adjuster may be configured such that for initiating the adjustment procedure the brake pad is moved by the actuator in the reverse direction into a predetermined reference position. The reference position is thus axially offset in the reverse direction with regard to the rest position.

In an example of the embodiment of the present invention, an actuator force required for moving the brake pad into the reference position, preferably starting from the rest position, is higher, preferably 5%, 10%, 20%, 30%, 40% or more than 50% higher, than an actuator force required for driving the output shaft in a forward direction into the frictional engagement of the brake pad and brake disc, and than an actuator force required for driving the output shaft in the reverse direction out of the frictional engagement between the brake pad and the brake disc. During normal operation of the brake assembly, especially during dynamic or service braking operations, the brake assembly must perform high dynamics such that the output shaft is driven in the forward and reverse direction with high speed, and in particular due to the inertia of the moving components of the brake assembly upon actuation the brake pad may be moved in the reverse direction beyond the rest position for a short time and a short distance. However, during those braking operations, the brake pad does not reach the reference position such that no adjustment procedure is initiated. Particularly, the brake pad is moved in a reverse direction at least 10 mm and/or at most 100 mm from the rest position.

According to a further development of the present invention, the brake assembly comprises a sensor unit for measuring an axial slack value, preferably an axial amplitude of the brake pad between the braking position and the rest position, in particular an axial amplitude of the brake pad between the braking position and the reference position. The axial slack value may also be defined as the distance between the brake disc in the rest position of the brake pad.

In another exemplary embodiment, the senor unit is arranged with regard to the actuator and/or is adapted such that the sensor unit measures a wear and tear level of the brake pad and/or brake disc. It is clear that the sensor unit maybe electronically connected with an electronic system (not shown) of the vehicle (not shown).

According to a further development of the present invention, the sensor unit comprises an optical sensor and/or an acoustic sensor, preferably for independently measuring the wear and tear level and/or the axial slack value. Alternatively, the optical and acoustic sensor may be realized as a redundant sensor system.

In another exemplary embodiment of the present invention, the brake assembly, particularly the actuator, comprises a control unit which is connected to the sensor unit such that in case the sensor detects an undesired wear and tear level and/or an undesired slack value, the actuator initiates the adjustment procedures, preferably moves the brake pad into the predetermined reference position. The control unit may be physically and/or electronically connected to the sensor unit. It is also possible that the control unit and the sensor unit communicate via a wireless communication system. Alternatively, the control unit and the sensor unit may be directly connected, for example via cables or via conductive tracks of a common printed circuit board (PCB) which may be coupled to the electronic system of the vehicle.

According to a further development of the present invention, the control unit compares the measured wear and tear level of the brake pad and/or brake disc and/or the measured slack value with a respective predetermined threshold value. The control unit may further initiate the adjustment procedure in case of a deviation between the measured and the respective predetermined threshold value. Preferably, the control unit only initiates the adjustment procedure if the deviation between the measured and the respective predetermined threshold value exceeds a predetermined deviation tolerance, for example of at most 3%, 5%, 7%, Or at most 10%.

In another example embodiment of the invention, the brake assembly may comprise an energy absorption and/or storage unit which is adapted to absorb forces acting on the output shaft in the reverse direction in case of a predetermined operation situation. A predetermined operation situation may occur in an uncontrolled situation of the brake assembly, for example upon unexpected energy supply shut-off or any internal malfunction of the brake actuator. During braking the force transmitting components of the brake assembly are preloaded according to the brake force level. In a controlled situation, the actuator moves the force transmitting components back to the initial unloaded position, preferably the rest position, and smoothly brakes down the movement of the force transmitting components. If an error, such as a malfunction or a power loss, occurs during the brake down movement without using a protection unit the brake actuator components would be further accelerated by the prestressed brake assembly component, preferably a caliper unit, and stopped by a shock-like collision or impact at the movement end position, thereby resulting in damage of the brake assembly components, preferably of the actuator.

In an example embodiment of the present invention, the energy absorption and/or storage unit is adapted to dissipate the absorbed forces, preferably the absorbed energy linked with the forces acting on the output shaft in case of the predetermined operation situation. For example, the absorbed forces respectively absorbed energy, may be dissipated by means of friction, electronic resistance or viscous dampening. Due to the arrangement and functioning of the energy absorption unit, in particular, due to the dissipation of the forces acting on the output shaft in the reverse direction in case of the predetermined operation situation, excessive forces respectively excessive energy is removed from the brake assembly system in order to prevent damage.

In an example embodiment of the present invention, the energy absorption and/or storage unit is adapted to accumulate the absorbed forces. Preferably, the energy absorption and/or storage unit comprises a spring member, an accumulator or a battery. The accumulated forces, particularly the accumulated absorbed energy, maybe fed into an energy recuperation system of the vehicle, preferably an energy recuperation system of the brake assembly. In this case, the absorbed accumulated energy may subsequently be used as an energy input for the actuator in a subsequent braking operation.

In a further example embodiment of the present invention, the energy absorption and/or storage unit is adapted to counteract the forces acting on the output shaft in the reverse direction in the predetermined operation situation. In a further development, the counteracting forces act such that the kinetic energy of the output shaft caused by the forces acting on the output shaft in the reverse direction is transferred into kinetic energy of the absorption unit, heat and/or electric energy. It is therefore possible, to accumulate at least part of the absorbed output shaft forces and dissipate at least part of the absorbed output shaft forces, depending on the available energy storing space or the energy needed for a subsequent brake operation.

In an example embodiment of the present invention, the energy absorption and/or storage unit is realized in that the actuator comprises an electric machine for driving the output shaft in the reverse direction and the forward direction. The electric machine may be operable in an electric generator mode which is adapted to absorb the output shaft forces in the predetermined operation situation. The electric generator mode maybe understood as an operation mode in which mechanical energy, preferably the kinematic energy for example of the output shaft or another driving output shaft of the actuator, is converted into electrical power respectively energy. Therefore, the excessive energy being present in the predetermined operation situation may be used to feed the electric generator mode and may be used to supply further electric components of the vehicle with the energy absorbed by the energy absorption unit.

In another example embodiment of the present invention, the brake assembly comprises the braking end position in which to brake pad and the brake disc are frictionally engaged. Further, a rest end position of the brake assembly is given in which the brake pad and brake disc are disengaged. A stop element may be arranged such that it limits the axial movement of the output shaft in the reverse direction beyond the rest position. This means that the stop element is positioned offset with respect to the rest position in the reverse direction. Further, the energy absorption and/or storage unit may be arranged such that an impact of the output shaft on the stop element is prevented, thereby preventing damage to the brake assembly.

In a further development of the present invention, the energy absorption and/or storage unit comprises a spring member or a viscous damper associated with the stop element such that upon movement of the output shaft from the rest position in the reverse direction a preferably oppositely oriented spring force and/or dampening force is applied on to the output shaft. The generated spring force and/or dampening force counteracts the critical forces acting on the output shaft in the reverse direction of the predetermined operation situation. Thus, the axial movement of the output shaft in the reverse direction is slowed down, preferably stopped.

According to an example embodiment of the present invention, the energy absorption and/or storage unit is an electric energy absorption and/or storage unit. Preferably, the energy absorption and/or storage unit is electrically activated, respectively deactivated, and or coupled to the actuator such that in case of the predetermined operation situation the energy absorption and/or storage unit is automatically activated in order to absorb the output shaft forces. According to a further development of the present invention, in case of the predetermined operation situation, the actuator engages a corresponding protection circuit, namely in terms of an electronic resistor for dissipating at least part of the absorbed energy and/or in terms of an electronic accumulator for storing at least part of the absorbed energy, even if the actuator is not supplied with energy.

In another example embodiment of the present invention, the energy absorption and/or storage unit comprises an eddy current brake, also known as an induction brake, electric brake or electric retarder, that slows down or stops the axial movement of the output shaft for example by dissipating the kinetic energy of the output shaft as heat. Upon movement of the output shaft in the reverse direction in the predetermined operation situation, preferably beyond the rest position, an electric current preferably through a coil of the energy absorption unit, preferably the eddy current brake, is induced, wherein particularly the induced electric current may be accumulated or dissipated by the energy absorption unit. According to the function principle of the eddy current brake electric current is induced because of an outer magnetic field acting on a moving component of the actuator or for example the output shaft, and the induced electric current induces a magnetic field which is oppositely oriented with regard to the outer magnetic field. Due to the fact of the oppositely oriented magnetic field with regard to the original magnetic field, the movement of the output shaft is slowed down, preferably stopped, whereby damage to the brake components resulting from high inertia and high dynamics of the brake actuator is prevented. It is possible that the electric resistor may be internally realized by the actuator itself, or externally realized by a separate electronic resistor component.

In an example embodiment of the invention, the actuator is coupled to the energy absorption and/or storage unit and configured in that the absorbed forces by the energy absorption and/or storage unit are dissipated by the actuator, wherein particularly the actuator comprises an electric resistor. For example, according to this embodiment, a brake resistor is provided which may be connected by default with a normally closed electric circuit and actively disconnected via a switch in normal operation mode, preferably if no predetermined operation situation occurs. Alternatively and or additionally, a capacitor may be connected to the circuit in order to store the absorbed energy preferably for reuse.

According to another example embodiment of the present invention, the actuator may be a pneumatic, electro-mechanic or hydraulic actuator. It is clear that the inventive concept according to the invention is therefore not limited to a specific type of actuator used in the corresponding brake assembly.

Especially in wheel-brake applications in which such energy absorption and/or storage units are necessary in order to prevent damage to the wheel brake assembly components the rest position is not suitable for initiating a slack adjustment procedure because during dynamic braking operation by the brake assembly the actuator, respectively the output shaft is returned to a slightly different axial direction after each braking operation, depending on the dynamics and force of the respective braking application. Therefore, it is of advantage of the present invention that another reference position which reliably triggers or initiates a slack adjustment procedure is defined.

The axial slack distance and/or the actual wear-and-tear level of the brake pad and/or the brake disc are measured by the sensor unit and communicated to the control unit of the actuator in order to adjust the axial slack distance. Via the sensor unit and the control unit, measurements may continuously be performed and evaluated in order to decide when a slack adjustment procedure is to be undertaken. Advantageously, the slack adjustment procedure is only initiated respectively triggered if needed. This decision is made according to predetermined threshold axial slack distance values and threshold wear-and-tear level values of the brake pad and/or brake disc.

In an exemplary embodiment, the reference position is defined by a predetermined force value applied by the energy absorption and/or storage unit. This means that when the brake pad is moved from the rest position into the reference position, thereby causing an energy absorption and/or storage unit force directed in the opposite direction, namely the forward direction, for example a force meter may be configured to measure the force value and thereby limit the axial movement of the brake pad in the reverse direction in order to reliably define the predetermined reference position. Alternatively, in case the energy absorption and/or storage unit is realized by means of a spring member, the reference position can be defined as the fully depressed respectively deformed position of the spring member.

It is noted that the method according to the invention can be defined such that it realizes the brake assembly according to the described aspects of the invention, and vice versa.

Preferred embodiments are given by the dependent claims.

The following detailed description refers to the accompanying drawings. The same reference numbers may be used in different drawings to identify the same or similar elements. In the following description, for purposes of explanation and not limitation, specific details are set forth such as particular structures, functionality, etc. in order to provide a thorough understanding of the various aspects of the claimed invention.

However, it will be apparent to those skilled in the art having the benefit of the present disclosure that the various aspects of the invention claimed may be practiced in other examples that depart from these specific details. In certain instances, the description of well-known devices and methods are omitted so as not to obscure the description of the present invention with unnecessary detail.

DETAILED DESCRIPTION OF THE DRAWINGS

Figure 1:
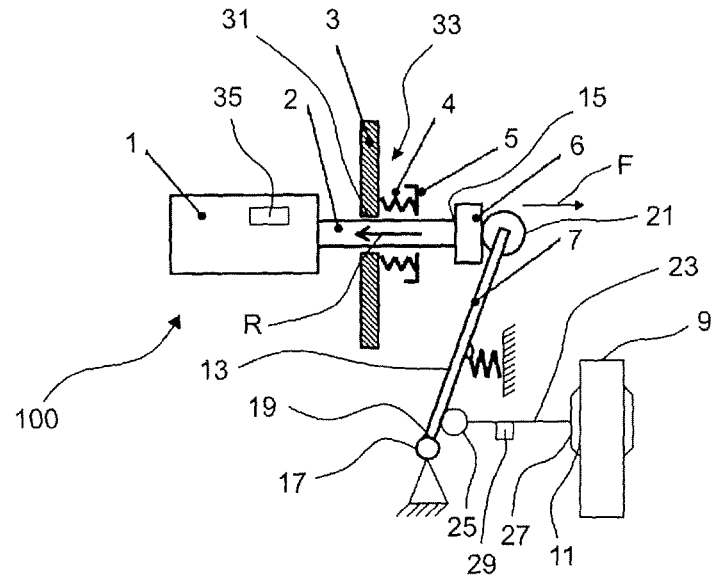
FIG. 1 is a schematic view of a brake assembly according to an embodiment of the invention in a first operation situation.

In the following detailed description of preferred embodiments of the present invention, a brake assembly is generally indicated with the reference numeral 100.

In FIG. 1, an active braking operation of the brake assembly 100 is shown. During the braking operation, a brake pad 11 is in frictional engagement with a brake disc 9, which is in rotational engagement with a wheel of a vehicle (not shown). In the braking operation, a clamping force is applied by the brake pad 11 onto the brake disc 9. Actuation of the brake pad 11 is realized by means of an arrangement of levers 13. The arrangement of levers 13 is coupled to an output shaft 2 which may be actuated by an actuator 1. The arrangement of levers 13 may be form-fittingly and/or force-fittingly coupled to the output shaft by means of a coupling member 6 arranged at a distal end 15 of the output shaft 2. The arrangement of levers 13 comprises a pivoting member 7 which is mounted pivotingly on a mounting 17, which is normally fixedly arranged to a chassis of the vehicle (not shown), with one end 19 of the lever 7. At another end 21 of the lever 7 diametrically arranged with respect to the end 19, the lever 7 is coupled to the output shaft 2, preferably by means of the coupling member 6, such that lever 7 may perform a pivoting movement with respect to the mounting 17 and such that the output shaft 2 may perform a translational movement in a forward direction F and a reverse direction R. For the purposes of the current invention, the forward direction F defines the moving direction of the brake pad 9 into the braking operation position, respectively into frictional engagement with the brake disc 9. Further, the reverse direction R defines the opposite direction, namely the moving direction of the brake pad 11 when disengaging the brake disc 9 and moving into a rest position in which no braking force is applied.

Generally, during operation of the brake assembly 100, the actuator 1, which may, for example, be an electromechanic actuator, generates actuator forces, which cause the output shaft 2 to be driven in the forward direction F and the reverse direction R in order to, respectively, bring the brake pad 11 and brake disc 9 into frictional engagement defining the braking position, and to disengage the brake pad 11 and brake disc 9 to release the frictional engagement. One axial end position of the output shaft 2 is defined by the frictional engagement of the brake pad 11 and brake disc 9, respectively, the braking position as shown in FIG. 1. The output shaft 2 is driven in the forward direction F to cause a pivoting movement of the lever 7 with regard to the mounting 17, such that a shifting lever 23 connected to the pivoting lever 7 at one end 25 and connected to the brake pad 11 at another end 27 transfers the axial movement of the output shaft 2 in the forward direction F into an axial movement of the brake pad 9 in the forward direction F into the frictional engagement with the brake disc 9. From FIG. 1 it is clear that the pivoting lever 7 is caused to pivot with regard to the mounting 17, thereby causing the axial movement of the lever 23 and, therefore of the brake pad 11.

The brake assembly 100 further comprises a slack adjuster 29, which is preferably a mechanical slack adjuster, which is adapted to adjust a predetermined axial slack distance between the brake pad 11 and the brake disc 9 in the rest position of brake pad 11. The slack adjuster 29 may be any adjusting device suitable for adjusting the axial slack distance between the brake pad 11 and the brake disc 9. For the purposes of illustration, the slack adjuster 29 is arranged at the shifting lever 23. However, it shall be clear that the slack adjuster 29 may be associated with other components of the brake assembly 100. The functioning and in particular the initiation of the slack adjustment procedure is explained in more detail with regard to FIGS. 2 and 3.

In FIG. 1, the other axial end position of the brake pad 11 respectively the output shaft 2 is indicated by a stationary end stop 3, preferably being fixedly attached to the chassis of the vehicle (not shown). The end stop 3 may be a thin-walled plate or disc preferably out of metal. The end stop 3 is arranged with regard to the output shaft 2 such that the output shaft performs a translational relative movement with regard to the end stop 3 in the forward direction F and the reverse direction R upon actuation by the actuator 1 and such that an axial movement of the output shaft in the reverse direction R is limited by the end stop 3. For example, the end stop 3 may comprise a through-hole 1 which is arranged concentrically with regard to the forward and reverse movement direction of the output shaft 2. As illustrated, an energy absorption and/or storage unit 33 is provided in order to absorb forces acting on the output shaft 2 in the reverse direction R in case of a predetermined operation situation. The energy absorption and/or storage unit 33 is arranged such that during normal operation of the brake assembly 100, respectively during dynamic braking operations, the brake pad 11 respectively the output shaft 2 does not reach the end stop 3. The energy absorption and/or storage unit 33 applies a force onto the output shaft 2 directed in the forward direction F in case the output shaft 2 is moved beyond the rest position into the reverse direction R.

Figure 2:
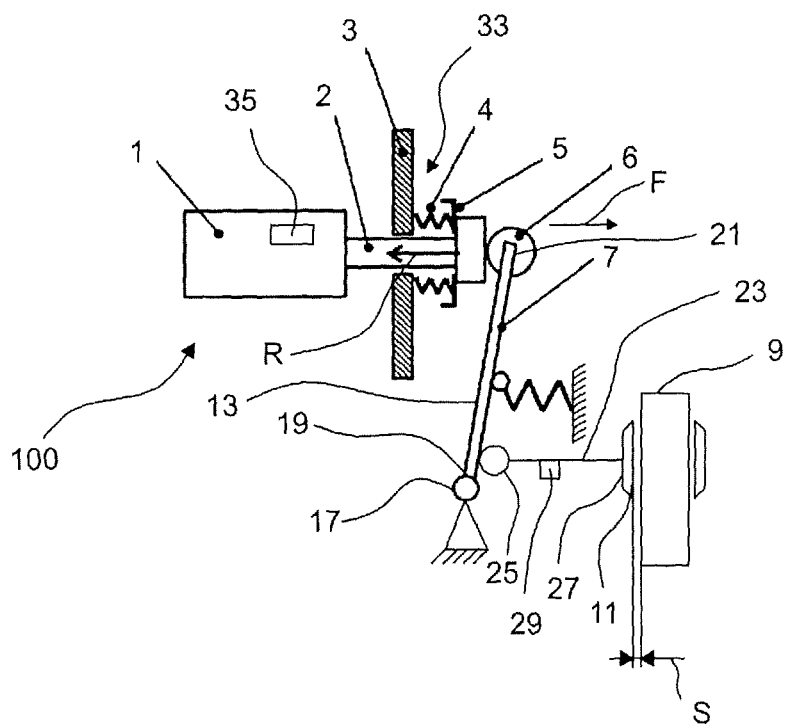
FIG. 2 is a schematic view of the brake assembly in a further operation situation.

In order to perform a slack adjustment procedure, the brake pad 11 and the output shaft 2 are moved into the rest position of the brake pad 11, shown in FIG. 2. In this operation state of the brake assembly 100, as shown in FIG. 2, an axial slack distance s exists between the brake pad 11 and the brake disc 9 in the forward and reverse direction F, R. Further, the output shaft 2 is moved in the reverse direction R such that the coupling member 6 contacts the energy absorption and/or storage unit 33, which, according to the illustrated embodiments, is realized by a spring unit 4. The spring unit 4 is supported with one end at the end stop 3, which is stationary, and with the other end at an actuation plate 5 which may be moved in accordance with a deformation of the spring unit 4. The rest position may also be referred to as the passive position in which no actuator braking force is applied, respectively in which no frictional engagement between the brake pad 11 and the brake disc 9 occurs and which defines the starting position of the brake pad 11 when the actuator 1 applies an actuation force to the output shaft 2 in order to perform a braking operation. Also, if a slack adjustment is necessary due to, for example, an undesired actual slack value and/or an undesired wear-and-tear level of the brake pad 11 and/or brake disc 9, the brake pad 11 is firstly brought into the rest position. The brake assembly 100 may, for example, comprise a sensor unit (not shown) for measuring the actual slack value and/or the actual wear-and-tear level of the brake pad 11 and/or brake disc 9. Further, the brake assembly 100, respectively the actuator 1, comprises a control unit 35 for electronically triggering a slack adjustment procedure. The control unit 35 may be connected to the sensor unit such that in case the sensor unit detects an undesired wear-and-tear level and/or an undesired slack value, the control unit 35 of the actuator 1 initiates an adjustment procedure. Therefore, the slack adjustment procedure is only initiated when necessary. Unnecessary adjustments are prevented.

Figure 3:
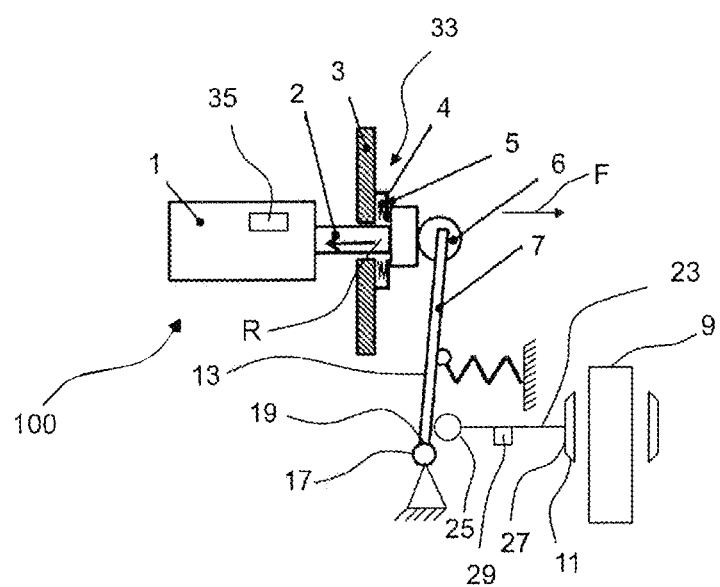
FIG. 3 is another schematic view of the brake assembly in another operation situation.

In order to initiate a slack adjustment procedure, preferably to start the slack adjustment procedure, the brake pad 11 respectively the output shaft 2 is moved further in the reverse direction R beyond the rest position of the brake pad 11, thereby performing a negative stroke. The slack adjustment procedure is therefore only initiated if a brake pad 11 has performed such a negative stroke, i. e. is moved in the reverse direction R beyond the rest position. The amplitude respectively the distance in the reverse direction R with regard to the rest position is to be determined such that during normal operation of the brake assembly 100 respectively during dynamic braking operation, the brake pad 11 does not reach the reference position, which is shown in FIG. 3. In case an energy absorption and/or storage unit 33 is provided, as shown in FIG. 3, the actuator 1 which actuates the output shaft 2 such that the brake pad 11 reaches its reference position has to overcome the energy absorption and/or storage unit force applied onto the output shaft 2 directed in the forward direction F, namely against the movement direction of the brake pad 11 respectively output shaft 2. Exemplarily, the energy absorption and/or storage unit 33 comprises a spring member 4 and an actuation plate 5 against which the coupling member 6 is fixedly attached to and against which the output shaft 2 abuts in the rest position such that, in order to reach the predetermined reference position, a spring force is generated by the spring member 4 upon its deformation caused by an axial movement of the output shaft 2 in the reverse direction R beyond the rest position.

Especially in wheel-brake applications in which such energy absorption and/or storage units 33 are necessary in order to prevent damage to the wheel brake assembly 100 components the rest position is not suitable for initiating a slack adjustment procedure because during dynamic braking operation by the brake assembly 100 the actuator 1, respectively the output shaft 2 is returned to a slightly different axial direction after each braking operation, depending on the dynamics and force of the respective braking application. Therefore, it is of advantage of the present invention that another reference position which triggers or initiates a slack adjustment procedure is defined.

As shown in FIG. 3, the reference position is offset beyond the rest position in the reverse direction R and is defined by a predetermined actuating force generated by the actuator 1 in order to bring the brake pad 11 respectively the output shaft 2 into the reference position. As can be seen in FIG. 3, in the reference position the axial distance between the brake pad 11 and brake disc 9 is bigger than the axial slack distance in the rest position. After the reference position is reached, the actuator force is released and the brake pad 11 respectively the output shaft 2 returns to the predetermined rest position which is then used for the slack adjustment procedure. The axial slack distance s and/or the actual wear-and-tear level of the brake pad 11 and/or the brake disc 9 are measured by the sensor unit (not shown) and communicated to the control unit 35 of the actuator 1 in order to adjust the axial slack distance s. Via the sensor unit and the control unit 35, measurements may continuously be performed and evaluated in order to decide when a slack adjustment procedure is to be undertaken. Advantageously, the slack adjustment procedure is only initiated respectively triggered if needed. This decision is made according to predetermined threshold axial slack distance values and threshold wear-and-tear level values of the brake pad 9 and/or brake disc 11.

The features disclosed in the above description, the figures and the claims may be significant for the realization of the invention in its different embodiments individually as in any combination.

REFERENCE SIGN LIST 1 actuator
2 output shaft
3 end stop
4 spring member
5 actuating plate
6 coupling member
7 lever
9 brake disc
11 brake pad
13 lever arrangement
15 end
17 mounting
19, 21 end
23 lever
25, 27 end
29 slack adjuster
31 through-hole
33 energy absorption and/or storage unit
35 control unit
100 brake assembly
F forward direction
R reverse direction
s axial slack distance

The invention claimed is:

1. A method for adjusting slack in a brake assembly comprising a brake disc, a brake pad, an actuator with an output shaft driven in a forward direction to bring the brake pad and brake disc into frictional engagement defining a braking position and a reverse direction to disengage the brake pad and brake disc and to move the brake pad into a rest position, and a slack adjuster for adjusting a predetermined axial slack distance between the brake pad and the brake disc, the method comprising:
   moving the brake pad from the rest position in the reverse direction into a predetermined reference position, wherein in the rest position the brake pad and the brake disc are frictionally disengaged; and
   initiating an adjustment of the axial slack distance between the brake pad and brake disc.

2. The method according to claim 1, wherein an axial slack value and/or a wear and tear level of the brake pad and/or brake disc is measured.

3. The method according to claim 2, wherein
   the axial slack value is an axial amplitude of the brake pad between the braking position and the reference position.

4. The method according to claim 2, wherein
   when an undesired wear and tear level and/or an undesired axial slack value is detected, the adjustment procedure is initiated, wherein the brake pad is moved in the reverse direction.

5. The method according to claim 2, wherein
   the measured wear and tear level of the brake pad and/or brake disc and/or the measured axial slack value is compared with a respective predetermined threshold value, and
   the adjustment procedure is initiated when a deviation between the measured and the respective predetermined threshold value is detected, wherein the adjustment procedure is only initiated when a deviation between the measured and the respective predetermined threshold value exceeds a predetermined deviation tolerance.

6. The method according to claim 2, wherein
   the brake pad is moved in the reverse direction against an energy absorption and/or storage unit arranged for absorbing forces acting on the output shaft in the reverse direction in case of a predetermined operation situation.

7. A brake assembly, comprising:
   a brake disc in rotational engagement with a wheel of a vehicle;
   a brake pad which frictionally engages said brake disc when an actuator force is applied thereto;

an actuator having an output shaft driven in a forward direction to bring the brake pad and brake disc in said frictional engagement defining a braking position, and a reverse direction to disengage the brake pad and brake disc and to move the brake pad into a rest position, wherein in the rest position the brake pad and the brake disc are frictionally disengaged;

a slack adjuster adjusting a predetermined axial slack distance between the brake pad and the brake disc in the rest position of the brake pad, wherein the slack adjuster is configured such that, for initiating the adjustment procedure, the brake pad is moved by the actuator in the reverse direction into a predetermined reference position.

8. The brake assembly according to claim 7, wherein an actuator force required for moving the brake pad into the reference position is higher than an actuator force required for driving the output shaft in the forward direction into said frictional engagement and in the reverse direction out of said frictional engagement, and the brake pad is moved in the reverse direction at least 10 mm and/or at most 100 mm.

9. The brake assembly according to claim 8, wherein the actuator force is more than 50% higher.

10. The brake assembly according to claim 7, further comprising:

a sensor unit for measuring an axial slack value in the form of an axial amplitude of the brake pad between the braking position and the rest position or an axial amplitude of the brake pad between the braking position and the reference position.

11. The brake assembly according to claim 10, wherein the sensor unit is arranged with regard to the actuator and/or adapted such that the sensor unit measures a wear and tear level of the brake pad and/or the brake disc.

12. The brake assembly according to claim 10, wherein the sensor unit comprises an optical sensor and/or an acoustic sensor.

13. The brake assembly according to claim 10, wherein the actuator comprises a control unit connected to the sensor unit such that, in case the sensor unit detects an undesired wear and tear level and/or an undesired slack value, the actuator initiates the adjustment procedure.

14. The brake assembly according to claim 13, wherein the control unit compares the measured wear and tear level of the brake pad, brake disc and/or the measured slack value with a respective predetermined threshold value, and initiates the adjustment procedure in case of a deviation between the measured and the respective predetermined threshold value, and the control unit only initiates the adjustment procedure when a deviation between the measured and the respective predetermined threshold value exceeds a predetermined deviation tolerance.

15. The brake assembly according to claim 7, further comprising:

an energy absorption and/or storage unit for absorbing forces acting on the output shaft in the reverse direction in case of a predetermined operation situation, wherein the energy absorption and/or storage unit is arranged such that the energy absorption and/or storage unit applies a force onto the output shaft directed in the forward direction when the brake pad is moved in the reverse direction into the predetermined reference position.

16. The brake assembly according to claim 15, wherein the reference position is defined by a predetermined force value applied by the energy absorption unit.

* * * * *